United States Patent [19]

Parr et al.

[11] 4,289,582
[45] Sep. 15, 1981

[54] NUCLEAR REACTOR COLLECTING TANK WITH THERMAL INSULATION

[75] Inventors: Armin Parr, Godorf; Harald Kleffner; Harald Leder, both of Bergisch Gladbach, all of Fed. Rep. of Germany

[73] Assignee: INTERATOM, Internationale Atomreaktorbau GmbH, Bergisch Gladbach, Fed. Rep. of Germany

[21] Appl. No.: 942,645

[22] Filed: Sep. 15, 1978

[30] Foreign Application Priority Data

Sep. 16, 1977 [DE] Fed. Rep. of Germany ....... 2741795

[51] Int. Cl.³ ................................................ G21C 9/00
[52] U.S. Cl. ...................................... 176/38; 176/87; 248/551; 248/DIG. 1
[58] Field of Search ............... 176/38, 65, 87, DIG. 2; 52/249, 265, 404, 48 T, 573; 248/550, DIG. 1

[56] References Cited

U.S. PATENT DOCUMENTS

| | | | |
|---|---|---|---|
| 1,463,052 | 7/1923 | Liptak | 52/487 |
| 2,486,348 | 10/1949 | Wehr | 52/249 |
| 3,269,070 | 8/1966 | Stoy | 52/249 |
| 3,367,075 | 2/1968 | Pierce | 52/249 |
| 3,394,521 | 7/1968 | Coleman | 52/249 |
| 3,702,802 | 11/1972 | Jansen | 176/38 |
| 3,868,302 | 2/1975 | Singleton | 176/87 |
| 3,888,730 | 6/1975 | Jackson | 176/65 |
| 3,899,393 | 8/1975 | Dorner | 176/87 |
| 3,937,433 | 2/1976 | Portaleoni | 248/550 |
| 3,946,528 | 3/1976 | Jacobson | 52/265 |
| 4,036,688 | 7/1977 | Golden | 176/38 |
| 4,094,737 | 6/1978 | Greischel | 176/87 |
| 4,157,802 | 6/1979 | May | 248/DIG. 1 |
| 4,180,951 | 1/1980 | Francioni | 176/87 |

FOREIGN PATENT DOCUMENTS

| | | | |
|---|---|---|---|
| 2709471 | 9/1978 | Fed. Rep. of Germany | 176/38 |
| 2299702 | 8/1976 | France | 176/38 |

Primary Examiner—Charles T. Jordan
Assistant Examiner—Edward F. Miles
Attorney, Agent, or Firm—Herbert L. Lerner

[57] ABSTRACT

Collecting tank for coolant escaping from a demolished vessel of a sodium-cooled nuclear reactor includes an outer steel shell having an inner lining of blocks stacked one on top of the other, frame means for holding the blocks at a side thereof within the collecting tank, and a common support structure, independent of the outer shell, supporting the frame means.

4 Claims, 11 Drawing Figures

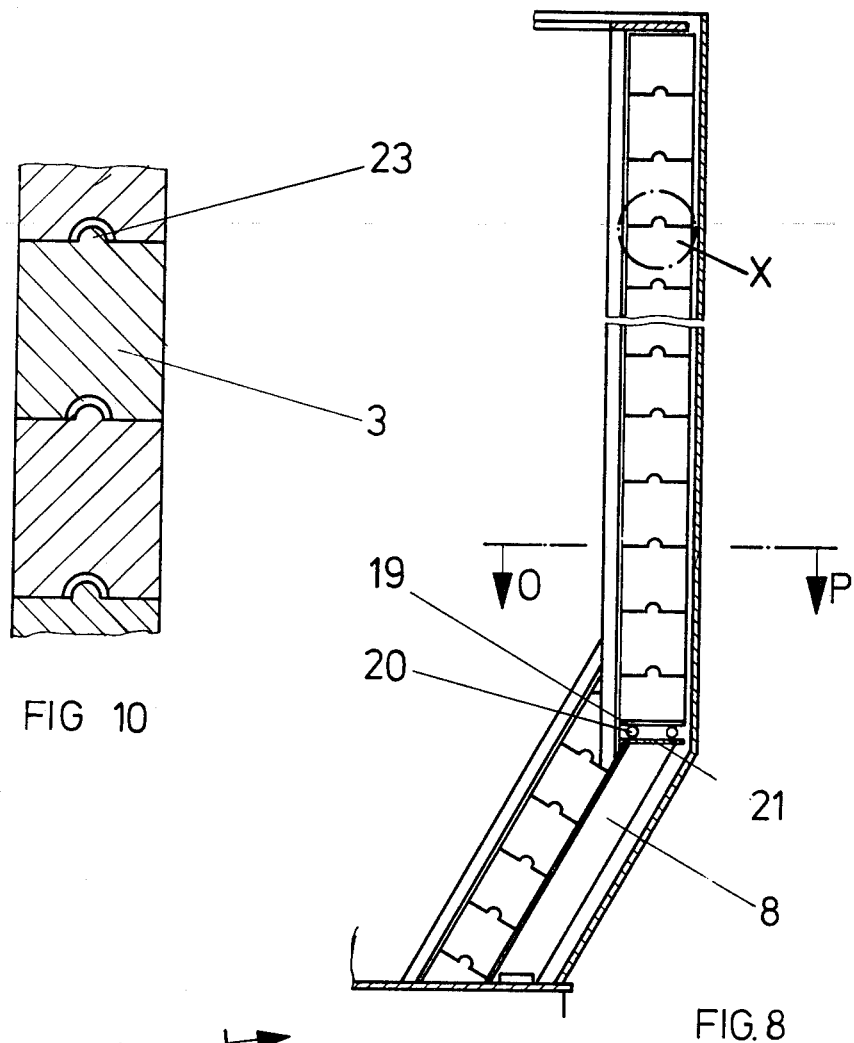
FIG. 10
FIG. 8
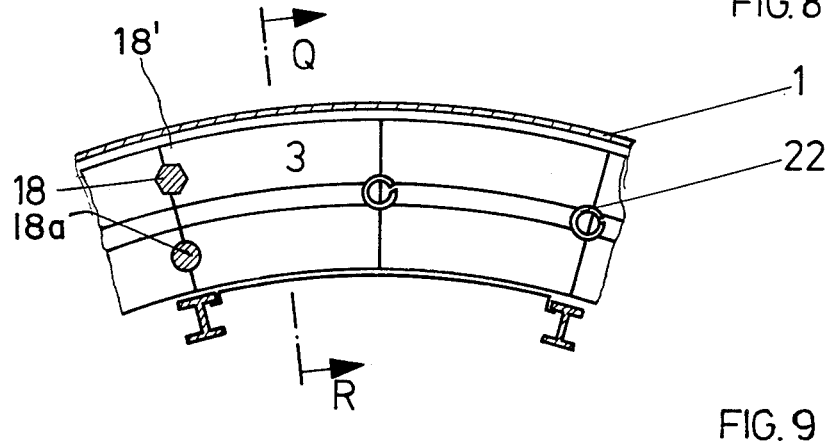
FIG. 9

NUCLEAR REACTOR COLLECTING TANK WITH THERMAL INSULATION

The invention relates to a tank or trough for collecting coolant escaping from a demolished vessel of a sodium-cooled nuclear reactor and formed of an outer steel shell with a lining of blocks stacked on top of one another. A so-called Bethe-Tait accident wherein, presumably, upon a hypothetical failure of all cooling loops with simultaneous failure of all shut-down devices in a liquid metal-cooled nuclear reactor, a prompt power excursion occurs resulting in the melting-down of the core, can have as a consequence that the core will melt through the bottom of the double reactor vessel and drop into a tray formed of high temperature-resistant material and suitably disposed for this purpose. This tray forms part of a collecting tank wherein the coolant (sodium, in the case at hand) flowing out of the demolished reactor vessel is collected in order to cool the debris of the reactor core until the activity has decayed. Calculations have shown that the sodium is initially heated in the course thereof to temperatures approaching boiling temperature. In accordance with the decreasing release of residual heat, this temperature then declines gradually. The collecting tank must be able to withstand these temperatures and chemical attack by the sodium, even if only once. In addition, the collecting tank is subjected to a certain amount of temperature stress and radiation exposure even during the previous standby or made-ready condition thereof. The tank per se, which is producible of steel alone due to requirements of imperviousness and strength, must be protected from the high temperatures. The possibility that suggests itself first, namely to equip the tank with a lining of refractive blocks like, for example, a combustion chamber exposed to hot flue gas, is not successful because of the large dimensions of the tank, the shock-like temperature stress anticipated in the event of an accident, and the very different magnitude of the temperature of the tank, since the varying thermal expansions of the tank and of the lining cannot be controlled. In addition, the materials suitable for the anticipated temperature stresses lack the necessary resistance to sodium.

An object of the invention of the instant application is to provide a collecting tank which permits the reliable holding or retention of a sizable quantity (e.g. 400 to 500 tons in a reactor of 300 $MW_{el}$) of sodium heated to substantially boiling temperature over an extended period of time.

With the foregoing and other objects in view, there is provided, in accordance with the invention, a collecting tank for coolant escaping from a demolished vessel of a sodium-cooled nuclear reactor comprising an outer steel shell having an inner lining of blocks stacked one on top of the other, common frame means for holding the blocks at a side thereof within the collecting tank, and a support structure, independent of the outer shell, supporting the frame means. This construction is permissible in this case because the tank is heated up only once and is used only for a relatively short time, as hereinaforementioned, contrary to a metal smelting furnace, for example. In this manner, downward crashing of the lining into the middle of the tank, which might otherwise have been expected, is thus avoided, and tying of the frame to the outer shell, which is objectionable for reasons of strength or stability, can be dispensed with. Thus, the outer shell and the lining can expand independently of one another in accordance with the different thermal expansion coefficients thereof.

In accordance with another feature of the invention, the blocks are formed of aluminum oxide ($Al_2O_3$) with an admixture of about 5% sodium oxide ($Na_2O$) and not more than traces of silicon (Si), and the spaces between the individual blocks are advantageously filled with the just-mentioned insulating material in the form of fibers. Tests have shown that the aforementioned aluminum oxide (in the form of substantially 97% beta alumina and substantially 2% alpha alumina) has the necessary thermal and chemical resistance.

In accordance with a further feature of the invention, the blocks are keyed to one another in the manner of building blocks.

In the gaps unavoidably existing between the individual blocks per se and between those blocks, on the one hand, and the outer shell, on the other hand, convection flow can develop in spite of the presence of the aforementioned fibrous material filling, which can result in delivery of ever new hot sodium to the outer shell and, thereby, to excessive stressing of the outer shell. To prevent such a convection flow, there is provided in accordance with an added feature of the invention, that the blocks are covered on the inner side of the collecting tank by thin, nearly tight or sealing metal sheets or sheetmetal. While these metal sheets do indeed permit sodium to penetrate to the outer shell, they are not exposed to pressure because they are, for example, not fastened over the entire circumference thereof, and they also withstand the thermal stresses by virtue of their elasticity. Thus, in accordance with an additional feature of the invention, the thin metal sheets are fastened to the frame holding the blocks and, respectively, cover each of the compartments of the frame.

In accordance with yet another feature of the invention, the blocks are stacked in the frame in such a manner that the frame is included in the lining. With proper shaping or formation of the blocks, a reliable connection can be produced between the structural parts in spite of the varying thermal expansion therebetween. In accordance with a particular feature of the invention, therefore, the frame is formed of double-T sections which, in addition to their advantageous ratio of weight and moment of resistance, are especially well suited to be keyed with the blocks.

If danger due to earthquakes must be taken into consideration with regard to the collecting tank, it is proposed, in accordance with yet a further feature of the invention, that the individual blocks be carried or rest in sheetmetal trays which are secured to the frame. In the event of very strong shocks, danger exists that the blocks of the lining may break due to the brittleness thereof. Because of the sheetmetal trays proposed in accordance with the invention, the fragments of each individual block would be held in place, in such a case, and a general breakdown of the lining would be prevented.

The hereinbeforementioned keying of the blocks to one another can be effected by projections which are formed on the blocks and engage in corresponding recesses with which an opposing block is provided. In any event, due to manufacturing tolerances, the projections, for example, leave gaps through which the hot sodium can circulate as a result of convection flow. To avoid these disadvantages, there is proposed, in accordance with yet an added feature of the invention that the keying members are formed of prismatic (inclusive, for example, of also cylindrical) bodies partly engaging in corresponding recesses formed in the blocks, the prismatic bodies being formed of hardenable aluminum oxide mortar disposed in the recesses and solidifying after the blocks have been stacked. By using the same material for the mortar as for the blocks, assurance is provided that all parts will expand in the same manner under the influence of the heat, and the sealing connection between the individual blocks will be preserved even if the blocks are subjected to stress.

As explained hereinbefore, the blocks of the lining and the structure supporting the blocks have different coefficients of thermal expansion. This can produce difficulties especially with respect to the radial expansion of the parts when exposed to the hot coolant, so that, in accordance with a further feature of the invention, the blocks and the support structure are formed of material having different coefficients of thermal expansion and are shiftable relative to one another in accordance with the different coefficients of thermal expansion.

In accordance with a more specific embodiment according to the invention, the collecting tank includes a base ring fastened to the support structure, a roller-carrying intermediate ring disposed on the base ring and being rollably shiftable in radial direction relative to the base ring, a support ring extending circumferentially within the outer shell and carrying the frame means, the support ring being divided into a plurality of sectors each of which is rollably shiftable in radial direction relative to the intermediate ring, stop means carried by the base ring, and a respective lever mounted on the intermediate ring and having one end thereof deflectable by the stop means and the other end thereof braced against the support ring.

If the coefficients of thermal expansion of the base and of the intermediate ring are matched to the length of the two lever arms, a force is produced through radially outwardly directed expansion of the base ring, and can act through the lever upon the lining in such a sense that a radially inwardly directed pressure is exerted upon the lining. This pressure is sufficient to press the blocks together against the likewise radially outwardly directed, although smaller, expansion thereof, so that the formation of gaps therebetween is inhibited. In accordance with and alternative feature of the invention, a base ring is secured to the support structure, a roller-carrying support ring carried by the base ring and extending circumferentially within the outer shell, the support ring carrying the blocks and being rollably shiftable in radial direction with respect to the base ring. In the last-mentioned case, the lining and the support structure shift relative to one another in a manner similar to that for a bridge on the abutments thereof.

The clamping or tightening of the blocks against one another at elevated temperature for maintaining the firm connection thereof and sealing of any gaps that might occur between them is effected, in accordance with another feature of the invention, by including slotted steel tubes disposed between the blocks and parallel to the axis of the collecting tank. These slotted tubes increase in diameter under the influence of higher temperatures more than unslotted tubes would do and, in fact, independently force the individual blocks apart, respectively, which results in a firm tightening or clamping thereof. The then formed gaps, especially the radial gaps, between the blocks are sealed, in accordance with a concomitant feature of the invention, by the disposition of the hereinaforementioned prismatic bodies or slotted steel tubes in or at the radially extending gaps between the blocks.

Other features which are considered as characteristic for the invention are set forth in the appended claims.

Although the invention is illustrated and described herein as embodied in nuclear reactor collecting tank with thermal insulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 2 to 10 show, in greatly enlarged views, details of the collecting tank of FIG. 1 wherein:

FIG. 2 is a fragmentary vertical sectional view of FIG. 1 as well as a fragmentary vertical sectional view of FIG. 3 taken along the line C—D showing a portion of the tank wall;

FIG. 3 is a horizontal sectional view of FIG. 2 taken along the line AB;

FIG. 4 is a vertical sectional view of FIG. 5 taken along the line G—H and showing another embodiment of the tank wall of the invention;

FIG. 5 is a horizontal sectional view of FIG. 4 taken along the line EF;

FIG. 6 is a vertical sectional view of FIG. 7 taken along the line M—N and similar to that of FIGS. 3 and 4 but showing a different portion of the tank vessel, of a further embodiment of the invention;

FIG. 7 is a horizontal sectional view of FIG. 6 taken along the line KL;

FIG. 8 is a vertical of FIG. 9 taken along the line Q—R and showing sectional view an added embodiment of the tank wall of the invention;

FIG. 9 is a horizontal sectional view of FIG. 8 taken along the line OP;

FIG. 10 is a further enlarged, fragmentary view of FIG. 8 showing the detail X.

Figure 1:
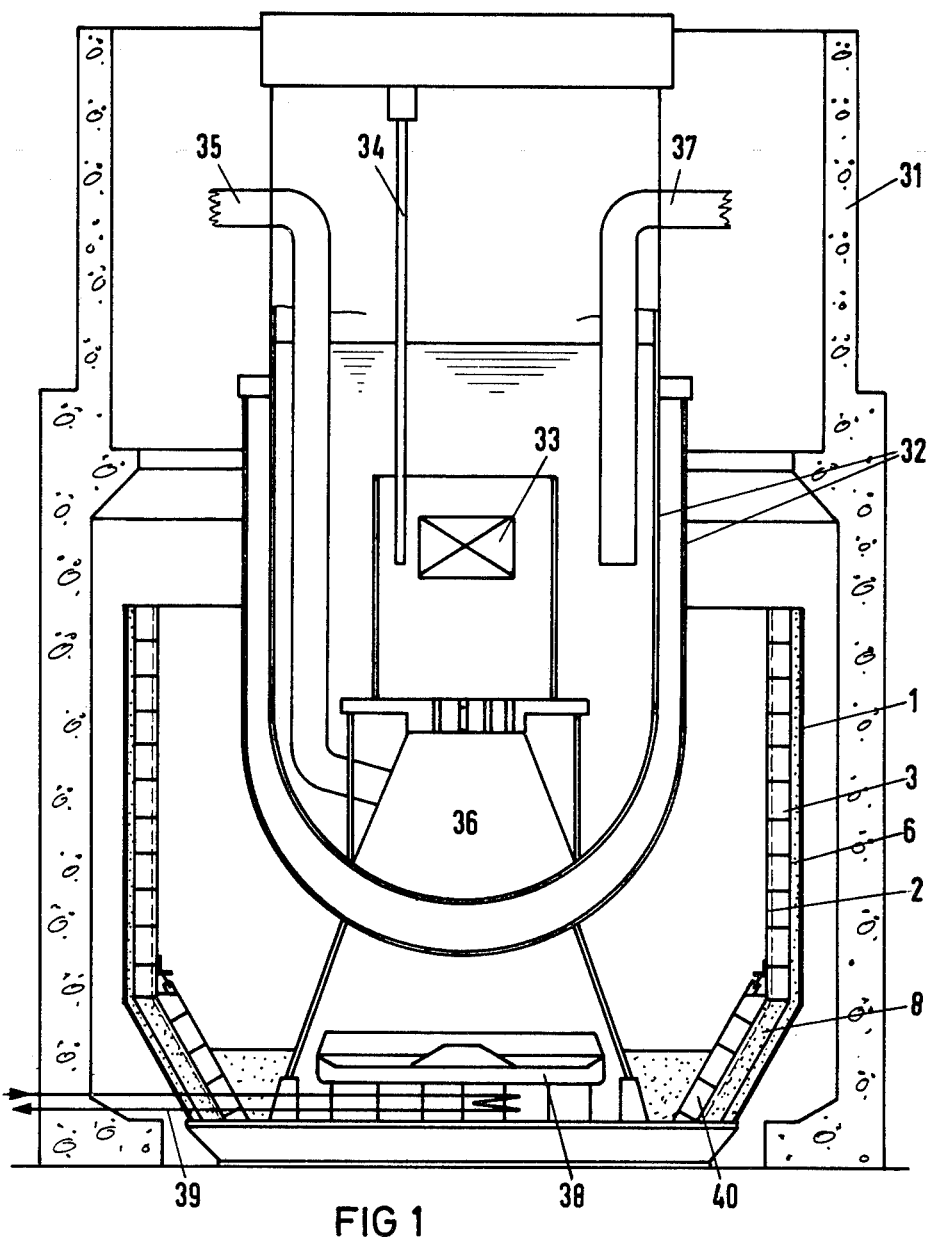
FIG. 1 is a diagrammatic vertical sectional view of a nuclear reactor equipped with a collecting tank for escaped coolant.

Referring now to the drawing and first, particularly to FIG. 1 thereof, there is shown a biological shield 31 of concrete wherein a double reactor tank 32 is disposed which is filled with liquid sodium during operation,. In this tank, in turn, there is a fission zone 33, optionally having a breeder blanket, the release of power of which is controlled by means of control rods 34, only one of which is shown in FIG. 1. The sodium which is cooled in non-illustrated heat exchangers, is fed through a pressure line 35 to an inlet plenum 36, from which it flows upwardly through the fission zone 33 and, thus heated, is returned to the non-illustrated heat exchangers through a suction line 37. If a failure of this cooling loop 35-37 and of further non-illustrated emergency cooling loops is presupposed and it is simultaneously assumed that it is not possible to shut down the reactor by means of the control rods 34, then the fission zone 33 would be exposed and would ultimately melt after a part of the coolant has evaporated. The core melt would destroy the double tank 32 and would drop into a collecting tank 38 (a so-called core catcher) disposed underneath the double tank 32 and which is provided with a lining of highly heat-resistant materials. If the double reactor tank 32 becomes leaky, the coolant still contained therein flows out and fills a collecting tank 40 to a level at which the core catcher 38 and the fragments of the fission zone 33 lying therein are reliably covered. An external event, presumably capable of triggering the occurrence described hereinbefore, could be a heavy earthquake. The collecting tank 40 which has a vertical axis must be constructed so that it remains intact even in such an event and reliably retains the escaped coolant. The tightness or leakproof nature of the collecting tank 40 is ensured by provision of an outer steel shell 1. Since the latter per se should not be exposed to the action of the hot sodium, it is provided with an insulating lining formed of a multiplicity of blocks 3 stacked one on top of the other and, if desired, with a backing of fibrous insulating material 6. Sintered aluminum oxide with an admixture of about 5% sodium oxide containing, at most, traces of silicon, is suitable as the insulating material which can withstand the anticipated temperatures of nearly 1150° C., as well as being resistant to sodium to the extent required.

Figure 2:
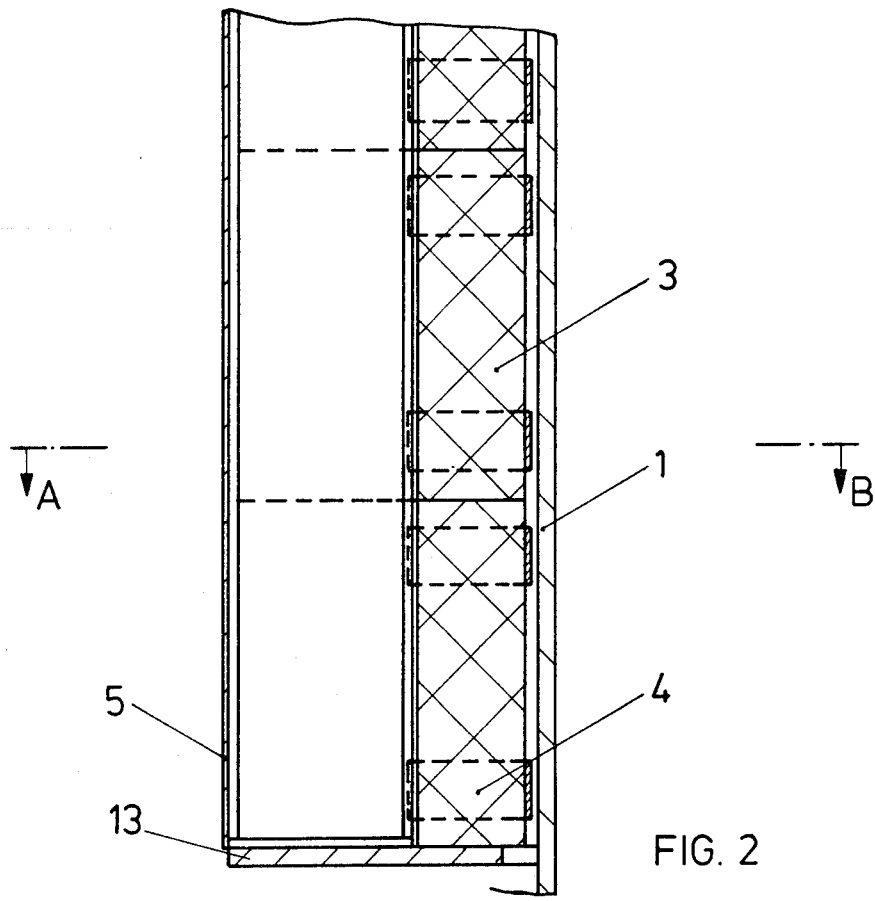
Figure 3:
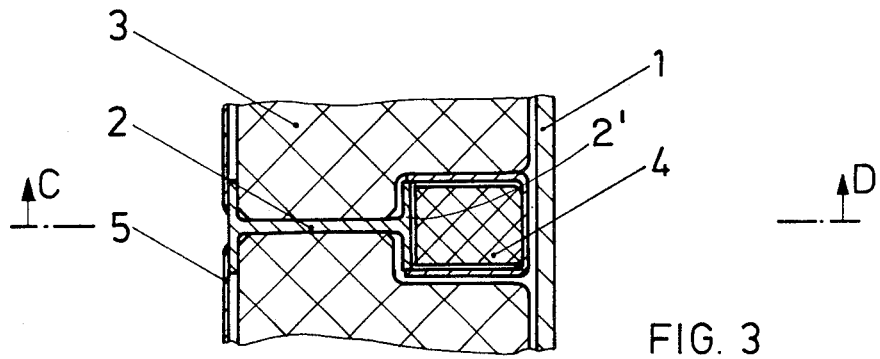

One possible embodiment of the lining of the collecting tank 40 is shown in FIGS. 2 and 3. The blocks 3 in FIGS. 2 and 3 are smooth-surfaced and are stacked on top of one another and held by a frame 2 which is made, for example, of double-T sections. The block 3 and the frame 2 stand on a support ring 13 which extends circularly within the collecting tank 40 and is fastened independently of the outer shell 1. To minimize the heat transfer to the outer shell 1, the frame 2 ends at some distance therefrom.

The space between an outer girder 2' of the frame 2 and the outer shell 1 is filled with special filler blocks 4 which are made of the same insulating material as are the blocks 3.

The individual compartments of the frame 2 are closed off by nearly tightly sealing metal sheets 5 which, though permitting sodium to pass through so that no varying pressure can develop on both sides, nevertheless, greatly impede the formation of convection flow in the immediate vicinity of the blocks 3 and thereby increase the effectiveness of the insulation.

Figure 4:
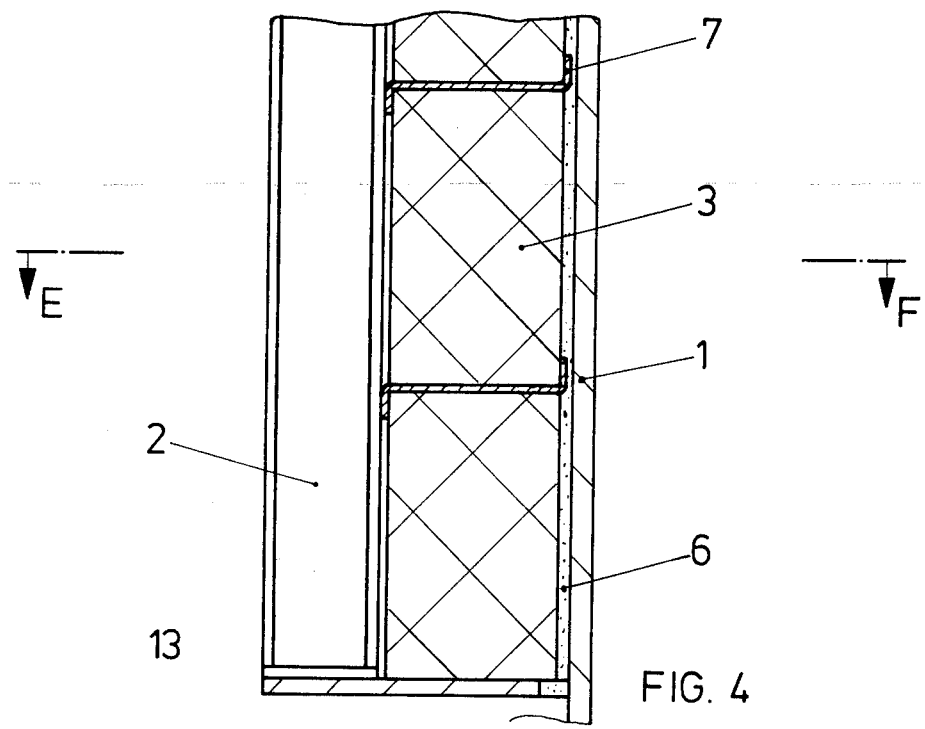
Figure 5:
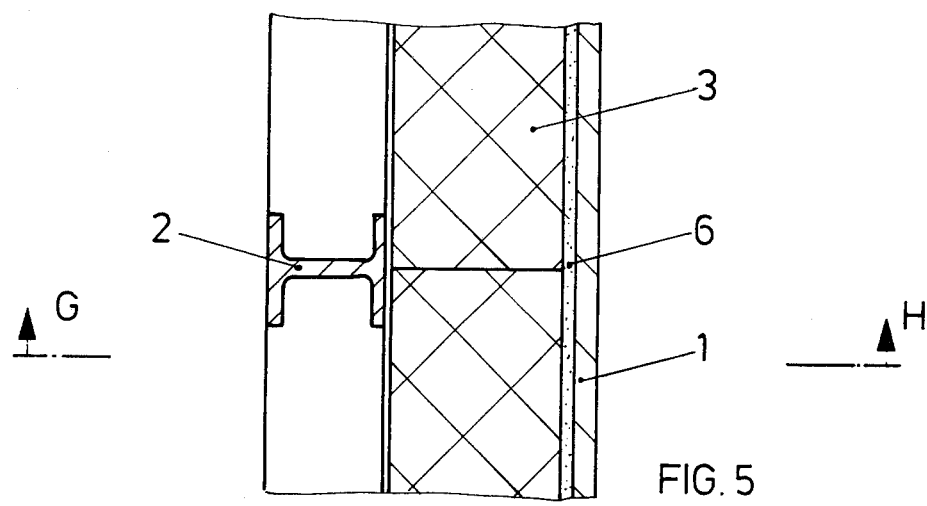

An alternative embodiment is shown in FIGS. 4 and 5 wherein the frame 2 is not made part of the assembly of the blocks 3 but is disposed to a side of them. Sheet metal trays 7 fastened to the frame 2 hold each of the blocks 3 even when the entire structure is subjected to heavy jolts, for example, due to an earthquake. To prevent convection in the space between the blocks 3 and the outer shell 1, the space is filled with a layer 6 of fibrous, for example, mat-shaped insulating material.

Figure 6:
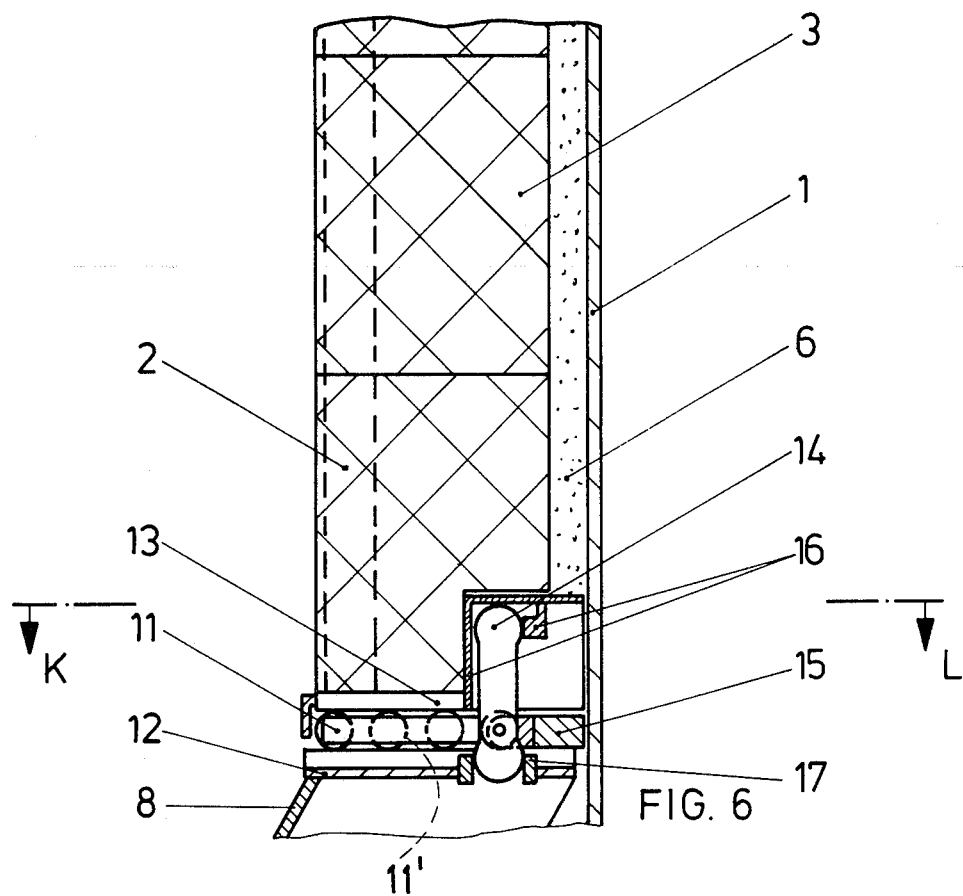
Figure 7:
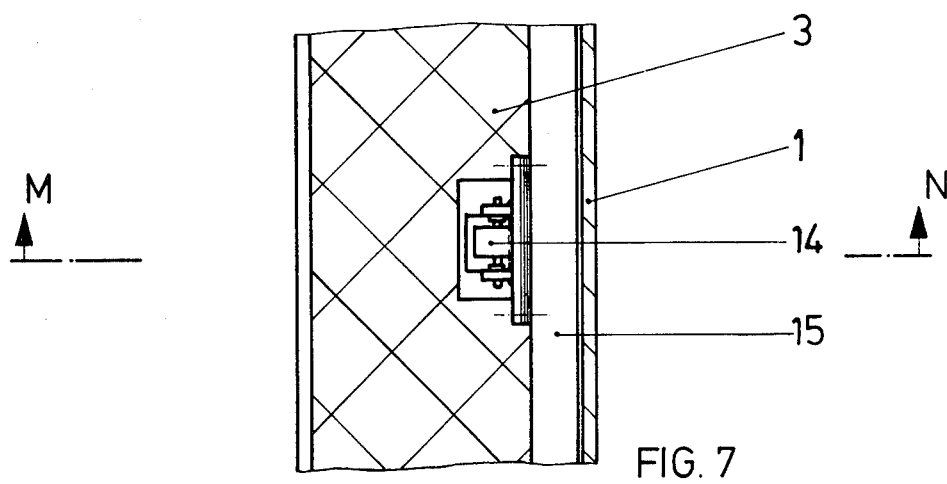

FIGS. 6 and 7 show a special embodiment of the invention wherein care is taken that gaps are not formed between the individual blocks 3 which would otherwise promote convection and make possible direct attack by the coolant on the outer shell 1 due to the varying thermal expansion between the blocks 3 and the outer shell 1. To this end, the support ring 13 is shiftable in the radial direction of the collecting tank 40 because it can slide on rolls 11. The rolls 11 are supported within bores 11' formed in an intermediate ring 15, and roll beneath the latter on a base ring 12, which is connected to the stationary support structure 8. The base ring 12 which is formed, for example, of austenitic steel, has a higher coefficient of thermal expansion than the intermediate ring 15, which is formed, for example, of ferritic steel. If the collecting tank 40 is filled with coolant, the base ring 12 expands to such a greater extent than the intermediate ring 15 that the base ring 12, by means of stop members 7 deflects a lever 14 articulatingly fastened to the intermediate ring 15. At the opposite end thereof, the lever 14 is clamped in further stops 16 and, when the length of the lever arm is properly selected, forces the support ring 13 and, thereby, also the frame 2 and the blocks 3 radially inwardly just so much that the gaps between the blocks remain closed.

In the embodiment of the invention shown in FIGS. 8 and 10, the individual blocks 3 are provided with projections 23 which engage the recesses correspondingly formed in the next adjacent blocks 3. The entire thus constructed wall rests on a support ring 19, which rolls by means of rolls 20 on a base ring 21 which is fastened to the support structure 8. The blocks 3 can thus, in accordance with the lower coefficient of thermal expansion thereof, move independently of the support structure 8.

In FIG. 9, two possibilities are shown for closing off the radial gaps between the individual blocks 3 in such a manner that direct access of the sodium to the outer shell 1 is avoided. The two possibilities are that either the blocks 3 are formed with recesses 18' into which mortar of aluminum oxide is poured after buildup of the insulation, so that prismatic or, for example, also cylindrical bodies 18 and 18a are formed. The individual blocks 3 are thus anchored to one another, the hardened mortar having the same coefficient of thermal expansion as the blocks 3. As an alternative thereto, slotted steel tubes 22 are disposable parallel to the central longitudinal axis of the collecting tank 40 and have a tendency to increase the diameter thereof under the action of heat. The blocks 3 are thus pressed together in the direction of the circumference of the collecting tank 40, and the radial gaps therebetween are sealed.

We claim:

1. Collecting tank for coolant escaping from a demolished vessel of a sodium-cooled nuclear reactor, comprising an outer steel shell having an inner lining of blocks stacked one on top of the other, frame means for holding said blocks at a side thereof within the collecting tank, support structure common to the blocks held by said frame means and, structurally independent of said outer shell, supporting said frame means, said blocks and said support structure being formed of material having different coefficients of thermal expansion and being shiftable relative to one another in accordance with said different coefficients of thermal expansion, a base ring fastened to said support structure, a roller-carrying intermediate ring disposed on said base ring and being rollably shiftable in a radial direction relative to said base ring, a support ring extending circumferentially within said outer shell and carrying said frame means, said support ring being divided into a plurality of sectors, each of which is rollably shiftable in radial direction relative to said intermediate ring, stop means carried by said base ring, and a lever for each of said sectors mounted on said intermediate ring and having one end thereof deflectable by said stop means and the other end thereof braced against said support ring.

2. Collecting tank for coolant escaping from a demolished vessel of a sodium-cooled nuclear reactor, comprising an outer steel shell having an inner lining of blocks stacked one on top of the other, frame means for holding said blocks at a side thereof within the collecting tank, a support structure common to the blocks held by said frame means and, structurally independent of said outer shell, supporting said frame means, said blocks and said support structure being formed of material having different coefficients of thermal expansion and being shiftable relative to one another in accordance with said different coefficients of thermal expansion, a base ring secured structure, and a roller-carrying support ring carried by said base ring and extending circumferentially within said outer shell, said support ring carrying said blocks and being rollably shiftable in radial direction with respect to said base ring.

3. Collecting tank having a vertical axis for coolant escaping from a demolished vessel of a sodium-cooled nuclear reactor, comprising an outer steel shell having an inner lining of blocks stacked one on top of the other, frame means for holding said blocks at a side thereof within the collecting tank, a support structure common to the blocks held by said frame means and, structurally independent of said outer shell, supporting said frame means, and slotted steel tubes disposed between said blocks and parallel to the axis of the collecting tank, said slotted steel tubes being radially heat-expansible for pressing said blocks together in the circumferential direction of the collecting tank and sealing radial gaps therebetween.

4. Collecting tank according to claim 3 wherein said slotted steel tubes are disposed at radially extending gaps between said blocks.

* * * * *